United States Patent
Fukada et al.

(10) Patent No.: US 7,377,582 B2
(45) Date of Patent: May 27, 2008

(54) SUPPORTING STRUCTURE AND SEAT APPARATUS HAVING A RETRACTABLE SEAT

(75) Inventors: Ryuta Fukada, Kariya (JP); Naoaki Hoshihara, Obu (JP); Hiroyuki Okazaki, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/387,956

(22) Filed: Mar. 24, 2006

(65) Prior Publication Data
US 2006/0214477 A1 Sep. 28, 2006

(30) Foreign Application Priority Data
Mar. 25, 2005 (JP) .............................. 2005-088025
Mar. 25, 2005 (JP) .............................. 2005-088254

(51) Int. Cl.
*B60N 2/36* (2006.01)
*B60N 2/30* (2006.01)

(52) U.S. Cl. ........................ 297/15; 297/331; 297/332; 297/334; 297/336

(58) Field of Classification Search ................. 297/15, 297/331, 332, 334, 336
See application file for complete search history.

(56) References Cited

U.S. PATENT DOCUMENTS

| | | | |
|---|---|---|---|
| 4,438,973 A * | 3/1984 | LaPointe | 297/344.22 |
| 6,099,072 A * | 8/2000 | Sturt et al. | 297/15 |
| 6,896,309 B2 * | 5/2005 | Satoh et al. | 297/15 X |
| 7,066,539 B2 * | 6/2006 | Hatta et al. | 297/15 X |
| 7,192,088 B1 * | 3/2007 | Trombley et al. | 297/335 |
| 7,273,254 B2 * | 9/2007 | Fujita et al. | 297/331 |
| 2001/0052718 A1 | 12/2001 | Sugiura et al. | |
| 2004/0046408 A1 | 3/2004 | Satoh et al. | |
| 2004/0169404 A1 * | 9/2004 | Imajo et al. | 297/15 |
| 2005/0057082 A1 | 3/2005 | Hatta et al. | |

FOREIGN PATENT DOCUMENTS

| JP | 2003-054297 A | 2/2003 |
|---|---|---|
| JP | 2003-118451 A | 4/2003 |

OTHER PUBLICATIONS

European Search Report Dec. 14, 2008.

* cited by examiner

*Primary Examiner*—Rodney B. White
(74) *Attorney, Agent, or Firm*—Finnegan, Henderson, Farabow, Garrett & Dunner, LLP (57) ABSTRACT

A seat apparatus include: a shaft rotated by a motor and operatively associated with the seat so as to move the seat; a first leg secured to the shaft and pivotably supported by the seat; a first spring, one end of which is fixedly attached to the shaft and an other end of which is fixedly attached to the seat; the first spring which biases the shift in a first direction; and a second spring, one end of which is fixedly attached to the shaft and an other end of which is fixedly attached to the seat, the second spring which biases the shaft in a second direction. The first direction opposes to the second direction.

20 Claims, 11 Drawing Sheets

SUPPORTING STRUCTURE AND SEAT APPARATUS HAVING A RETRACTABLE SEAT

CROSS REFERENCE TO RELATED APPLICATIONS

This application is based on and claims priority under 35 U.S.C. §119 with respect to Japanese Patent Application 2005-088025, filed on Mar. 25, 2005, and Japanese Patent Application 2005-088254, filed on Mar. 25, 2005, the entire content of which is incorporated herein by reference.

FIELD OF THE INVENTION

This invention generally relates to a supporting structure and a seat apparatus for a retractable seat.

BACKGROUND

It is possible to support an object via a four-joint link mechanism and to shift the object from a position A to a position B while operating the four-joint link mechanism by use of an electric motor. A seat for a vehicle, which is disclosed in JP2003-118451, is described as an example hereinafter.

A seat for a vehicle has a seat cushion and a foldable seat back. The seat cushion and the folded seat back are stowed in a stowing space, such as a receiving recess, defined on a surface of a floor of a vehicle. The stowing space can be provided ahead of, or behind, the seat. Accordingly, it is possible to expand an inner space of a vehicle, to assure a space for placing baggage therein, and to allow an occupant to have an extra room to be seated in the vehicle so that the occupant can be relaxed for example.

A seat such as the seat for a vehicle described above, in which the seat can be stowed or retracted, includes a pair of front legs, which is freely pivotably supported at or about a front portion of a seat cushion frame, and a pair of rear legs, which is freely pivotably supported at or about a rear portion of the seat cushion frame. Each front and rear leg is normally engaged with a striker secured on a floor of a vehicle via a locking unit configured with a latch and a pawl, thereby keeping the seat at a use/deployed position at which an occupant can be seated on the seat cushion.

The front leg of the seat for a vehicle described above is connected to the rear leg by means of a lever. A shaft, which serves as a rotational axis of each rear leg, is operatively connected to the electric motor. Therefore, when the electric motor is driven, the shaft, i.e., the rotational axis of each rear leg, is rotated, and the rear leg can be pivoted in a rotational direction about the rotational axis. Meanwhile, the locking unit, which is configured with the latch and the pawl, is brought into an unlock state against the striker by an actuator.

As for the front leg, which is connected to the rear leg by means of the lever, the front leg is pivoted about a pivot via the lever which is moved in response to rotation of the rear leg. Meanwhile, the locking unit of the front leg, which is configured with the latch and the pawl, is brought into an unlock state against the striker by an actuator. In such circumstances, free ends of both front and rear legs approach each other. Both front and rear legs are folded, and the seat can be stowed at a predetermined position by a supporting member of the seat cushion.

The supporting member of the seat cushion is a four-joint link mechanism having a pair of first link and a pair of second link. One of the first links is arranged at a laterally one side of the seat, while the other one thereof is arranged at the laterally other side of the seat. One end of each first link is pivotably connected to the seat cushion, while the other end thereof is pivotably connected to the floor of the vehicle (in most cases, connected to a floor at both sides of a stowing space). Likewise, one of the second links is arranged at a laterally one side of the seat, while the other one thereof is arranged at the laterally other side of the seat. One end of each second link is operatively associated with the seat cushion, while the other end thereof is pivotably connected to the floor of the vehicle (in most cases, connected to a floor at both sides of a stowing space). The second link is pivotably supported by the seat cushion frame via the rear leg.

As described above, in response to rotation of the rear leg by the electric motor, the front leg is pivotably rotated via the lever, which connects the rear leg and the front leg, and one of the first link and the second link can be moved along a predetermined path so as to stow the seat at the predetermined position. Here, the other one of the first link and the second link is moved following the movements of the link moved along the predetermined path and the seat and expressing a fixed trajectory. Therefore, the seat of the vehicle is stowed inside a predetermined space in response to movements of the legs and the supporting member. Further, the seat of the vehicle can return or go back to the seat use/deployed position at which an occupant can be seated on the seat.

According to the above described seat, when an object (e.g., an occupant) is replaced or moved on the seat, or when the seat is switched between the stowed position and the use/deployed position, a degree of load applied to the electric motor may fluctuate in accordance with changes in a center of gravity of the object or the seat itself in a longitudinal direction or/and in a vertical direction. In such circumstances, an occupant may obtain an unpleasant feeling as to a smoothness of the seat movement, the smoothness which may become worse due to backlash of gears of a speed reducing mechanism of the electric motor. Moreover, the seat may be moved rapidly, to a position, at which the seat is expected to stop, or to a position, at which the locking unit establishes a locked state, which may supply an unpleasant feeling to an occupant.

The present invention has been made in view of the above circumstances, and provides a stowed-type or retracted-type seat which supplies a pleasant feeling to an occupant.

SUMMARY OF THE INVENTION

According to an aspect of the present invention, a seat apparatus includes: a seat; a shaft rotated by a motor and operatively associated with the seat so as to move the seat; a first leg secured to the shaft and pivotably supported by the seat; a first spring, one end of which is fixedly attached to the shaft and an other end of which is fixedly attached to the seat, the first spring which biases the shaft in a first direction; and a second spring, one end of which is fixedly attached to the shaft and an other end of which is fixedly attached to the seat, the second spring which biases the shaft in a second direction. The first direction opposes to the second direction. The first spring can exert a biasing force while the second spring is exerting a biasing force, and vice versa.

The seat apparatus can further include a link mechanism which operatively supports the seat on a stationary portion. The link mechanism can include a first link pivotably supported by the seat and the stationary portion and a second link. One end of the second link can be secured to the first leg and the other end thereof can be pivotably supported by the stationary portion. The first leg is rotated in response to rotation of the shaft.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is described herein with reference to FIGS. 1 to 11.

Figure 1A:
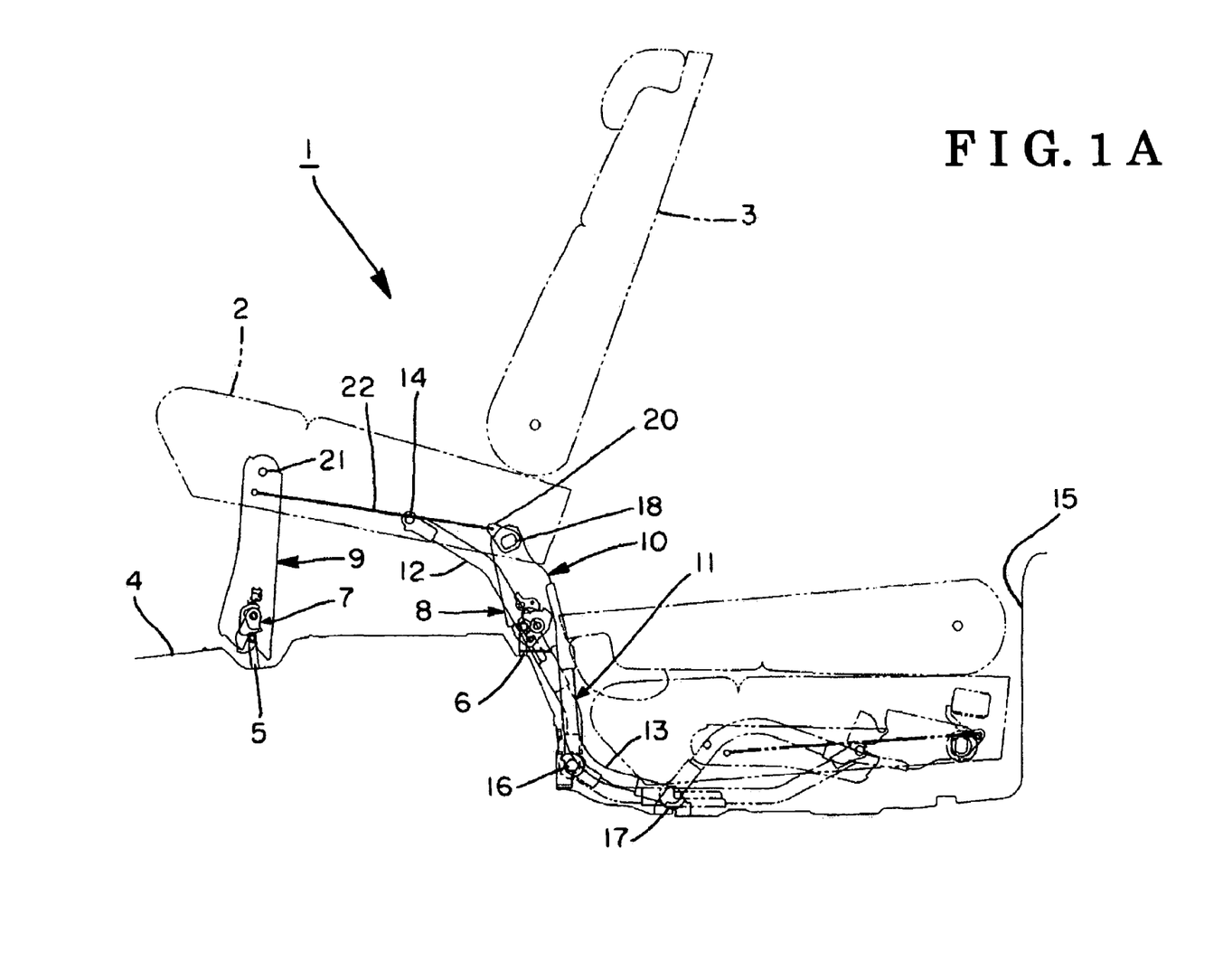
FIG. 1A is a side view illustrating a seat having a supporting member according to an embodiment of the present invention.
Figure 1B:
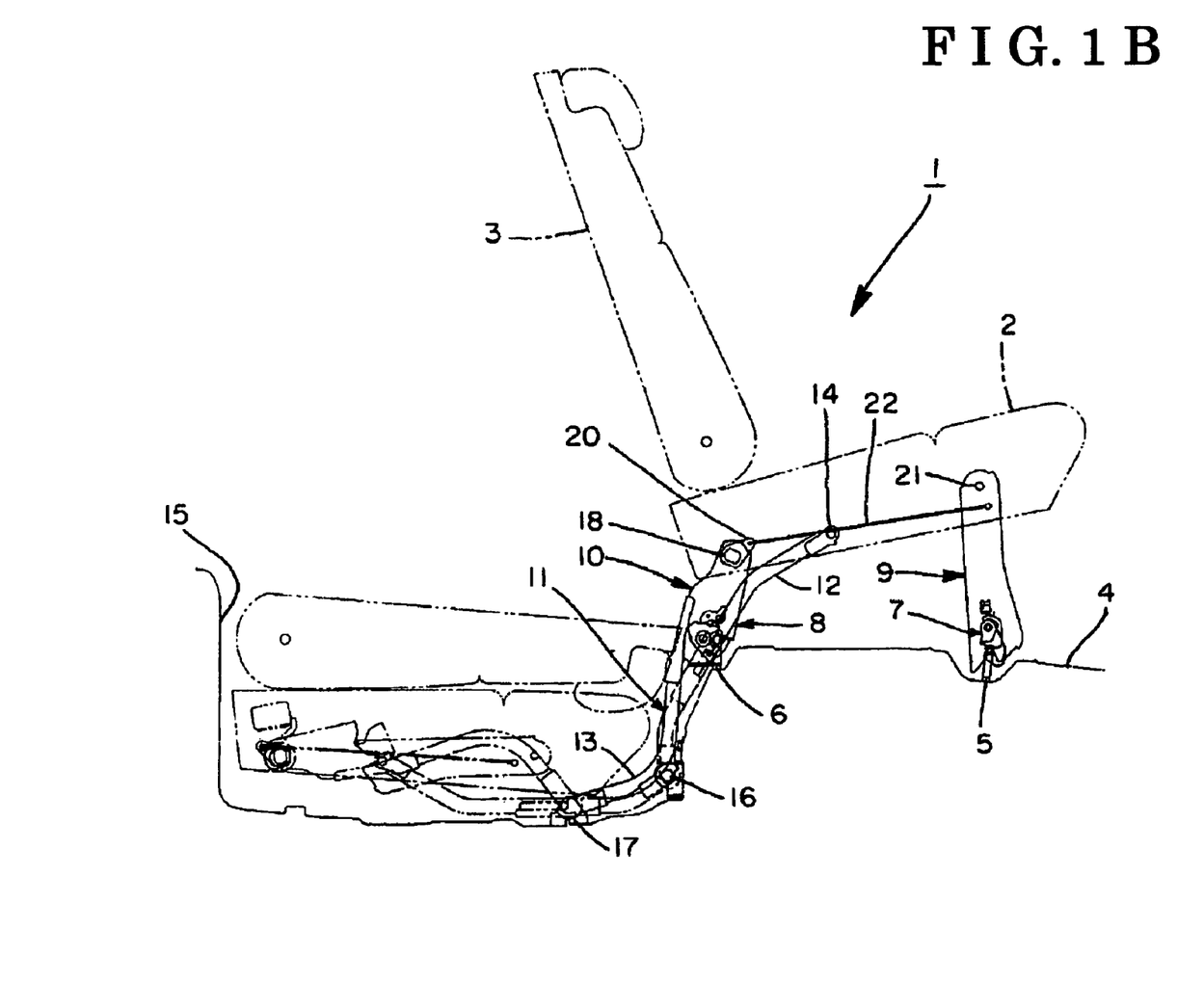
FIG. 1B is another side view illustrating the seat having the supporting member from an opposite side.

As illustrated in FIG. 1, a seat 1, which is applicable for a vehicle, includes a seat cushion 2 and a seat back 3 that is retractable or foldable. The seat cushion 2 is supported on a floor 4 (a stationary portion) of the vehicle by means of a pair of front legs 9 and a pair of rear legs 10 (a first leg, a second leg). The front legs 9, which make a pair and are arranged substantially in parallel to each other in a lateral direction of the seat 1, operatively attach the seat cushion 2 to the floor 4. Likewise, the rear legs 10, which make a pair and are arranged substantially in parallel to each other in a lateral direction of the seat 1, operatively attach the seat cushion 2 to the floor 4. Each front leg 9 is equipped with a lock mechanism 7 that is freely engageable with a striker 5 secured to the floor 4, while each rear leg 10 is equipped with a lock mechanism 8 that is freely engageable with a striker 6 secured to the floor 4. It is to be understood that both front legs 9 possess the same general configuration and so the description below applies to both front legs. Likewise, it is to be understood that both rear legs 10 possess the same general configuration and so the description below applies to both rear legs.

According to the embodiment of the present invention, the seat 1 is operatively attached to the floor 4 by the pair of front legs 9 and the pair of rear legs 10. Alternatively, the seat 1 can be operatively attached to the floor 4 by a front leg 9 and a rear leg 10. Still alternatively, the seat 1 can be operatively attached to the floor 4 by one of a front leg 9 and a rear leg 10. In each circumstance, the seat 1 supported by the front leg 9 and the rear leg 10, and the seat 1 supported by one of the front leg 9 and the rear leg 10 can function in the same manner as the seat 1 supported by the pair of front legs 9 and the rear legs 10 and can yield the same effects.

A supporting member 11, which operatively supports the seat cushion 2 so as to switch a position of the seat 1 among a seat retracted/stowed position (a second position), a seat deployed/use position (a first position) and an intermediate position therebetween, is configured with a four-joint parallel link mechanism (a link mechanism) having a pair of links 12 (a first link, a third link) and a pair of links 13 (a second link, a fourth link). The links 12 make a pair and are arranged in parallel to each other in the seat lateral direction, while the links 13 make a pair and are arranged in parallel to each other in the seat lateral direction. It is to be understood that both links 12 possess the same general configuration and so the description below applies to both links 12, which is applied to both links 13 in the same manner.

According to the embodiment of the present invention, the supporting member is configured with the pair of links 12 and the pair of links 13. Alternatively, the supporting member can be configured with a link 12 and a link 13. Still alternatively, the supporting member can be configured with one of a link 12 and a link 13. In each circumstance, the supporting member can function in the same manner as the supporting member having the pair of links 12 and the pair of links 13, and can yield the same effects.

One end of the first link 12 is supported by a pivot 14 of a cushion frame 2a of the seat cushion 2, and the other end thereof is supported by a pivot 16 inside a seat stowing space 15. One end of the second link 13 is secured to the rear leg 10, and the other end thereof is supported by a pivot 17 inside the seat stowing space 15. The seat stowing space 15 can be defied in the floor 4 and extends downward from a surface of the floor 4 and opens upward through the surface of the floor 4. Moreover, the seat stowing space 15 can be defined any place of the floor 4, such as ahead of the seat 1, behind the seat 1, or at the side of the seat 1.

Figure 2:
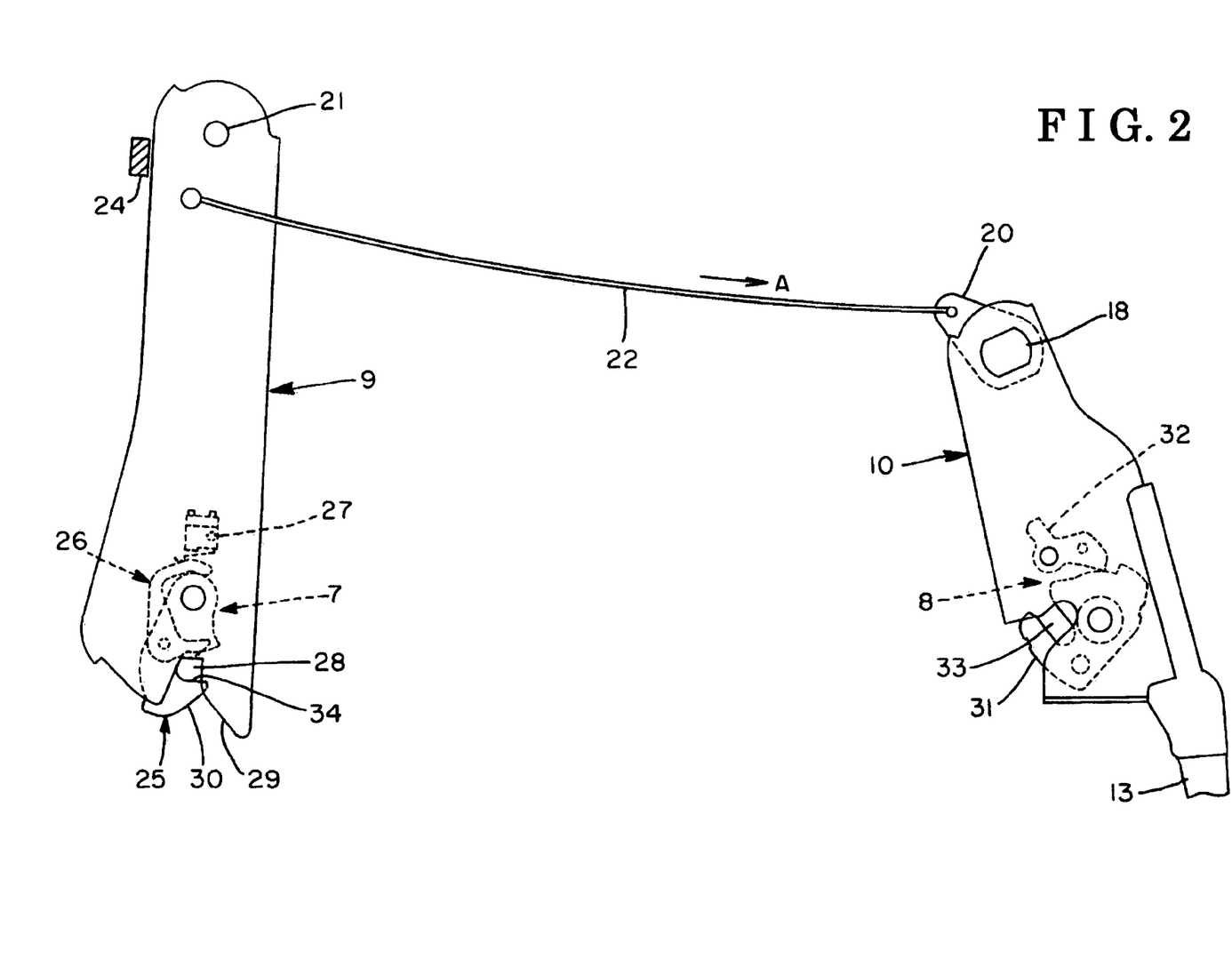
FIG. 2 is a view illustrating a torsion spring connecting a rear leg and a front leg illustrated in FIG. 1.
Figure 3:
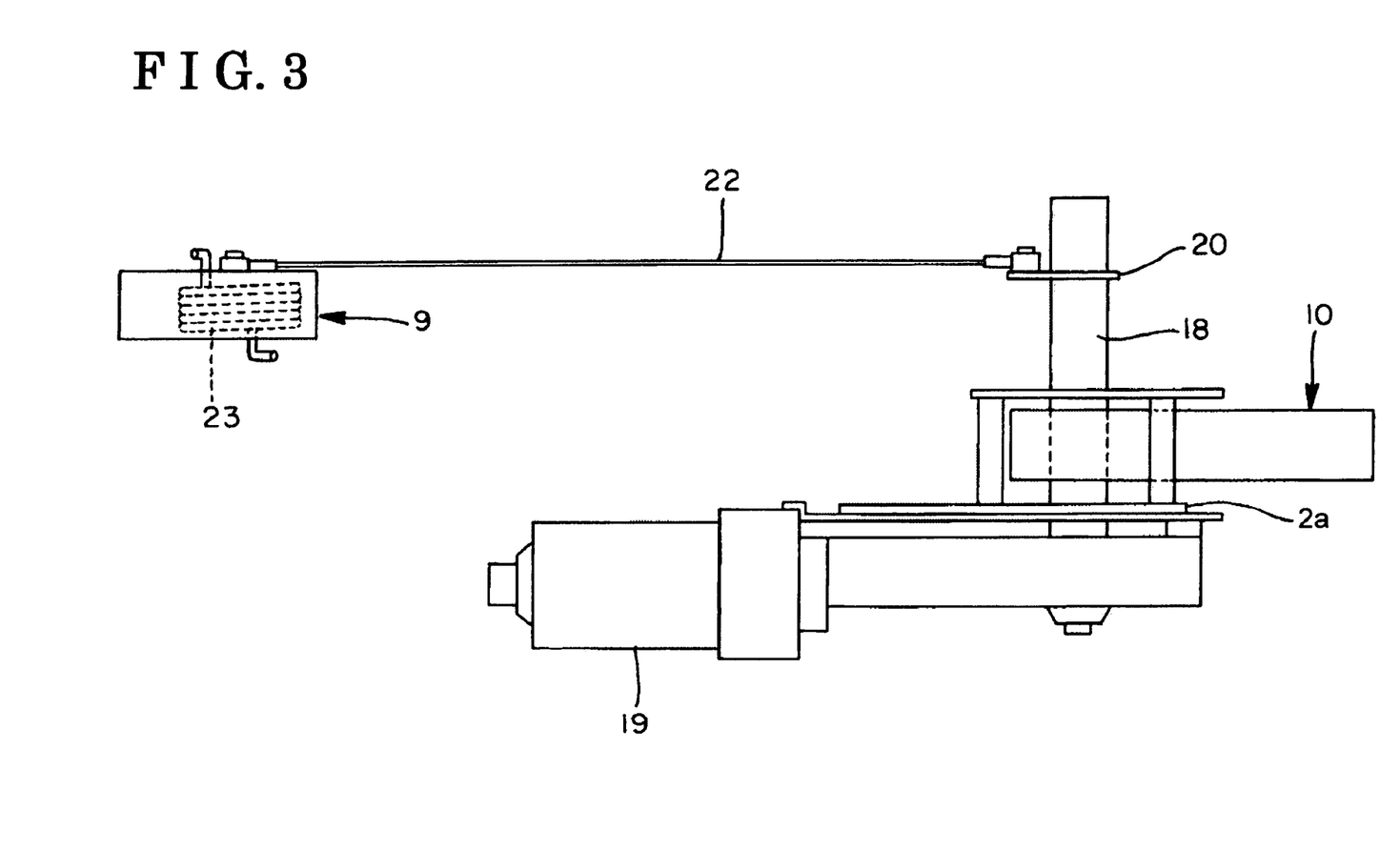
FIG. 3 is a plan view illustrating the front leg, the rear leg and the torsion spring.
Figure 4:
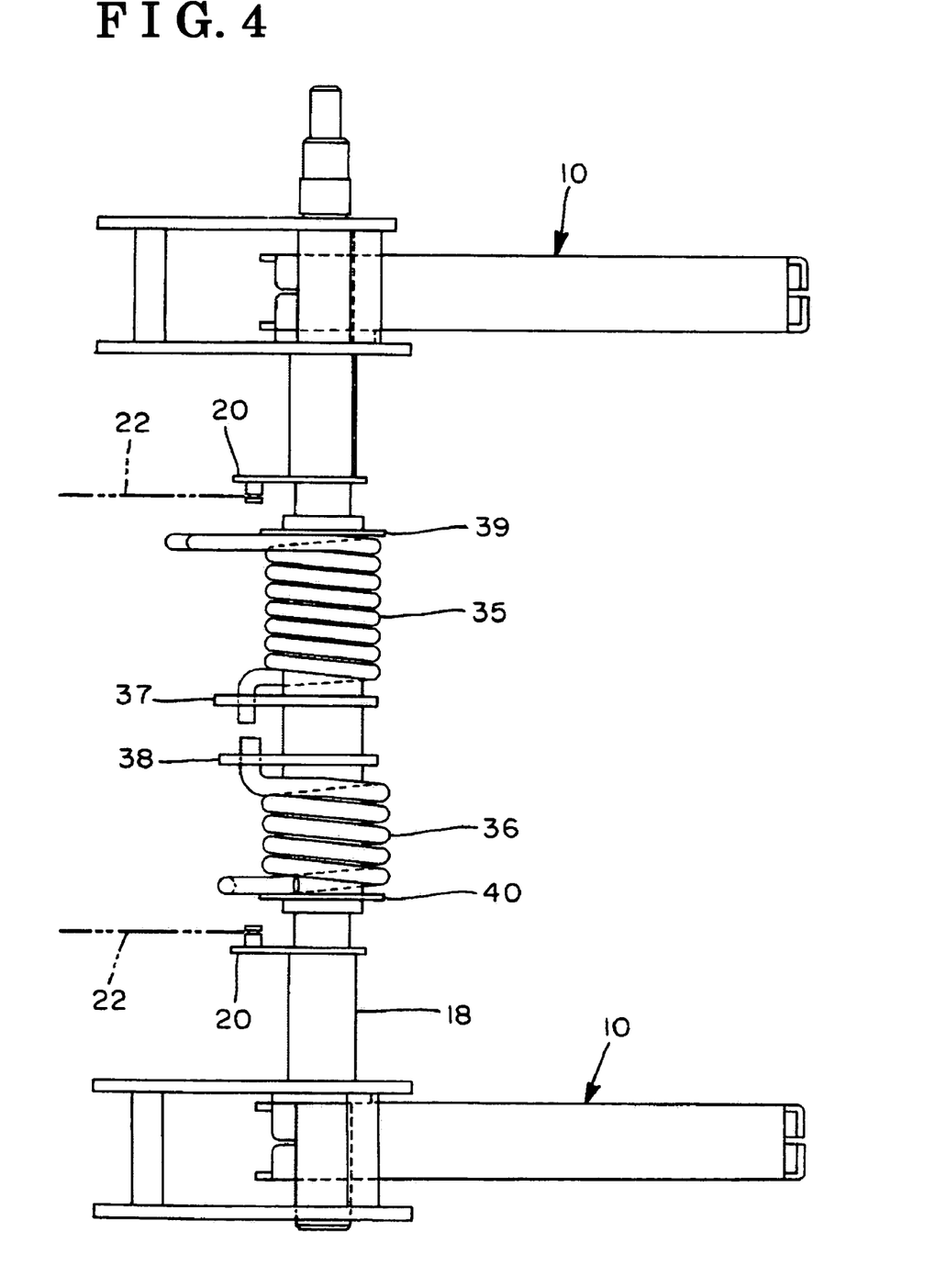
FIG. 4 is a plan view for explaining a condition in which the rear leg, a shaft, and a pair of springs are mounted.
Figure 5:
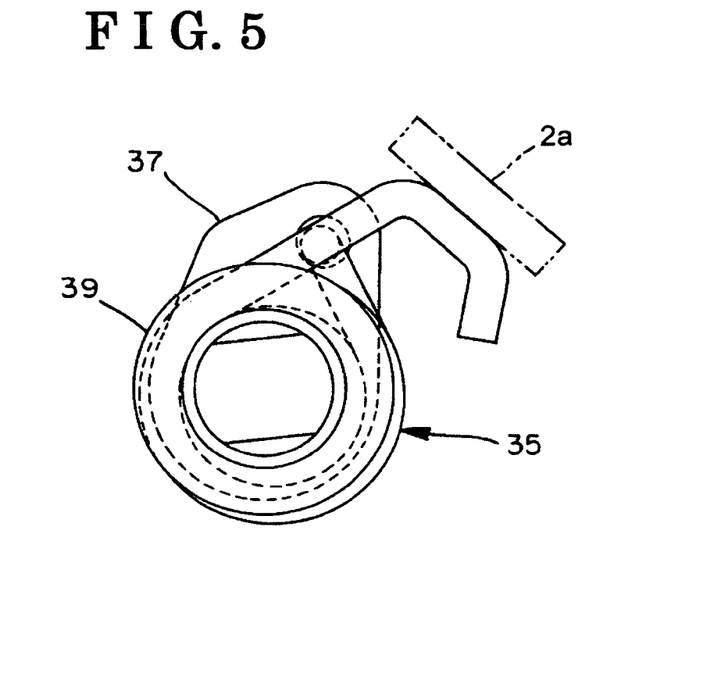
FIG. 5 is a view illustrating one of the pair of springs.
Figure 6:
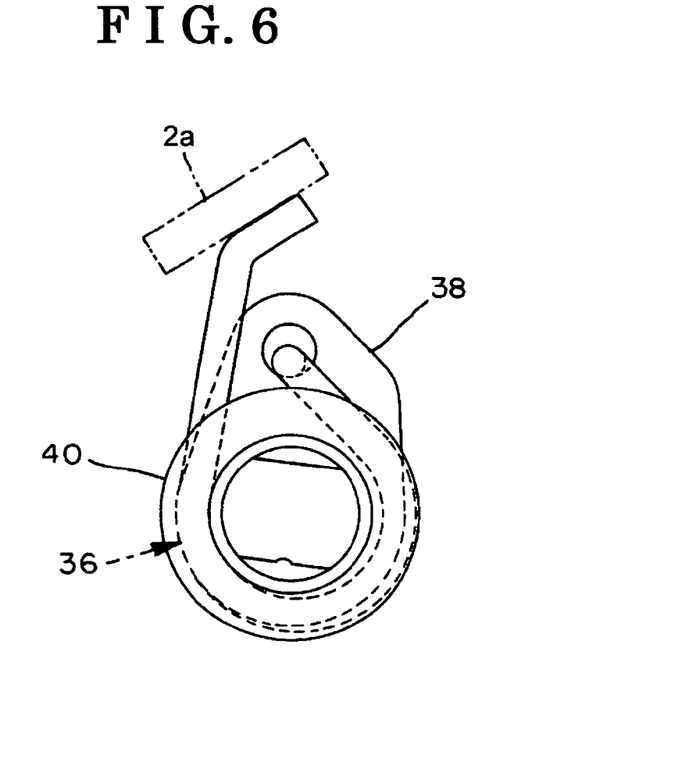
FIG. 6 is a view illustrating the other one of the pair of springs.

As is apparent from FIG. 3, a shaft 18 freely pivotably supports the rear leg 10 relative to the seat cushion frame 2a. The shaft 18 is driven to rotate by an electric motor 19 fixedly mounted on the seat cushion frame 2a. The electric motor 19 rotates the shaft 18 and pivotably rotates the rear leg 10 fixed to the shaft 18 and the second link 13 secured to the rear leg 10 relative to the seat cushion 2. A cable bracket 20 is fixedly attached to an end portion of the shaft 18. The front leg 9 is pivotably attached to the seat cushion frame 2a via a pivot 21 (illustrated in FIGS. 1 and 2). A torsion cable 22 extends between a portion below the pivot 21 and the cable bracket 20 and connects the portion below the pivot 21 to the cable bracket 20. The front leg 9 is urged by a spring 23 (illustrated in FIG. 3) clockwise in FIG. 2 and yet is restrained by a stopper 24 (illustrated in FIG. 2).

As illustrated in FIG. 2, the lock mechanism 7 of the front leg 9 includes: a hook 25 which is pivotably supported by the front leg 9; a lever 26 which is pivotably supported by the hook 25; and a switch 27 which has a contact faces a free end of the lever 26. The hook 25 and the lever 26 are normally biased by a spring (not illustrated) so as to establish a lock position illustrated in FIG. 2. A rotational axis of the hook 25 is offset against a rotational axis of the lever 26. A free end of the front leg 9 possesses a groove 28 and a taper surface 29 extending from the groove 28. The striker 5 is configured to insert into the groove 28 along the taper surface 29 and comes in contact with a taper surface 30 of the hook 25, wherein a force, which is generated by this contact and exerts against a biasing force of the spring, rotates the hook 25 clockwise as viewed from FIG. 2. The striker 5 then rotates the lever 26 counterclockwise as viewed from FIG. 2. The free end of the lever 26 operates the switch 27 so as to output a signal representing the lock mechanism 7 at the locked state illustrated in FIG. 1.

The lock mechanism 8 of the rear leg 10 includes: a latch 31; and a pawl 32. When the pawl 32 is not engaged with the latch 31, the latch 31 is biased in one direction by a spring (not illustrated). When the striker 6 is inserted into a groove 33 of the latch 31, the striker 6 pushes the latch 31 against a biasing force of the spring. Once the striker 6 is fitted into the groove 33, the pawl 32 is engaged with the latch 31 in favor of the biasing force of the spring, wherein a locked state is established.

Described below is about a fundamental operation of each component in the case where the seat 1 are stowed or retracted into the seat stowing space 15.

When an operation switch is turned on for the purpose of stowing the seat 1, the seat back 3 is folded or tilted forwardly. Being associated with the forwardly folding of the seat back 3, an actuator, which is not illustrated, is activated so as to operatively rotate the pawl 32 and the latch 31 counterclockwise as viewed from FIG. 2, wherein an engagement between the striker 6 and the latch 31 is discontinued. In conjunction with that, the electric motor 19 is activated so as to rotatably drive the shaft 18. The rear leg 10 is hence rotated clockwise about the shaft 18, and the cable bracket 20 is also rotated in the same direction. The clockwise rotation of the cable bracket 20 leads the torsion cable 22 to shift in an arrow direction A (in FIG. 2) and the front leg 9 to rotate counterclockwise about the pivot 21. In response to such counterclockwise rotation of the front leg 9, the striker 5 pushes a taper surface 34 of the hook 25 and rotates the hook 25 clockwise. In such circumstances, the striker 5 is pulled out of the groove 28, wherein the unlocked state is established. Alternatively or in addition, an actuator (not illustrated) can be employed so as to impose the hook 25 to switch from the locked state to the unlocked state.

When the electric motor 19 is driven so as to approach the free ends of the respective legs 9 and 10 to each other, the rear leg 10 and the second link 13 connected as a unit thereto are rotated clockwise about the pivot axis 17. Accordingly, the seat 1 is stowed, in response to operation of the supporting member 11 as the four-joint parallel link mechanism, in the stowing space 15 as illustrated by an imaginary line in FIG. 1.

According to a conventional structure, in which a front leg is connected to a rear leg by use of a lever, and a movement of the front leg varies in accordance with a movement of the lever, it is necessary or preferable to absorb lost motion of the lever. Therefore, a cramp with a long hole, which can be fixed to one end of the lever, or a long hole, which can be defined at the front leg, can be employed so as to absorb such lost motion of the lever. That is, the one end of the lever is connected to the front leg via this long hole. In such circumstances, for example when a vehicle drives on a rough road, a connected portion between the long hole of the front leg and the lever tolerates undesirable vibration or rattling of the lever, which is considered as one of factors of occurrence of vibration noise. Further, once the lever, which is a rigid body, is applied with an unexpected exterior force to deform, a locus of the front leg is deviated from a predetermined locus. In such cases, there may be a danger that the front leg interferes or impacts with a floor of a vehicle or the rear leg. This may interrupt a seat for a vehicle from being shifted to an appropriate retracted/stowed position or to an appropriate use position.

According to the embodiment of the present invention, the front leg 9 is connected to the rear leg 10 by means of the torsion cable 22. The torsion cable 22 can be twisted and absorb lost motion. Therefore, a mechanism for absorbing lost motion such as a long hole is not required. Moreover, an occurrence of noise due to vibration of a component such as a lever can be effectively avoided.

As described above, the lock mechanism 7 is applied to the front leg 9 of the seat 1 having the seat cushion 2 and the seat back 3 which can be freely folded. Alternatively or in addition, the lock mechanism 7 can be applied to other units such as a slide door.

Described below are the first spring 35 and the second spring 36, which are coiled on the shaft 18 and are torsion springs. One end of the first spring 35 is fixedly attached to a spring bracket 37 secured to the shaft 18, while the other end thereof is in contact with the seat cushion frame 2a (see FIG. 5). The first spring 35 supplies a brake spring torque denoted with a broken line in a diagram of FIG. 11. The second spring 36, which supplies a biasing force working in an opposite direction to a biasing force of the first spring 35, is coiled on the shaft 18. One end of the second spring 36 is fixedly attached to a spring bracket 38 secured to the shaft 18, while the other end thereof is in contact with the seat cushion frame 2a (See FIG. 6). The second spring 36 supplies an assist spring torque denoted with a long broken line in FIG. 11. The first spring 35 and the second spring 36 can be prevented from being released in a lateral direction of the vehicle. Therefore, it is possible to supply an amount of torque required to appropriately operate the seat 1.

Figure 11:
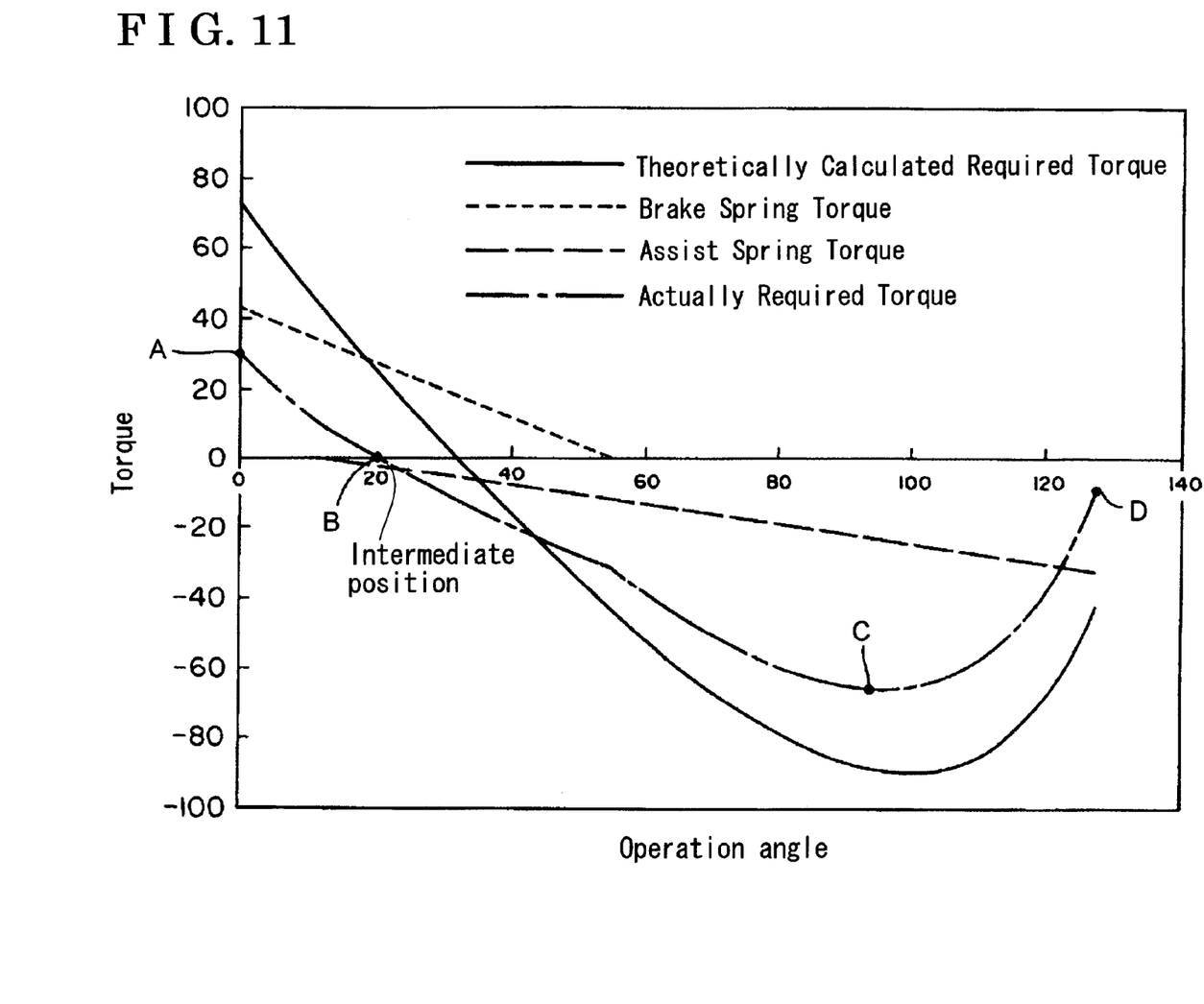
FIG. 11 is a diagram for explaining a relationship between an operation angle of the supporting member and a torque for moving the seat.

As is obvious from FIG. 11, the brake spring torque of the first spring 35 starts showing the effect before the seat 1 reaches an intermediate position in the case where the seat 1 is shifted from the seat stowed position (a second position) to the seat use position (a first position). The seat 1 is determined to be at the intermediate position when a center of gravity of the seat 1 is vertically collinear with a rotational center of the supporting member 11. In general, when the seat 1 is shifted from the seat stowed position to the seat use position, an empty weight of the seat 1 may interrupt the shifting of the seat 1. In other words, the empty weight of the seat 1 may apply a force to push the seat 1 downwardly. According to the embodiment of the present invention, the brake spring torque of the first spring 35 is applied to the electric motor 19 so as to drop a rotational speed of the motor 19. It is therefore possible to avoid or restrain an influence of the empty weight of the seat 1 which may be subjected to the movement of the seat 1, and to control a rotational speed of the motor 19 at an appropriate level. When the seat 1 is shifted from the seat use position to the seat stowed position, the first spring 35 assists an operation force of the electric motor 19 until the seat 1 reaches the intermediate position.

As described above, when the seat 1 is shifted from the seat use position to the seat stowed position, the shaft 18 is rotated clockwise in FIG. 1, and the first spring 35 assists the clockwise rotation of the shaft 18 by biasing the shaft 18 in the same clockwise direction. On the other hand, when the seat 1 is shifted from the seat stowed position to the seat use position, the shaft 18 is rotated counterclockwise in FIG. 1, and the first spring 35 restrains the clockwise rotation of the shaft 18 by biasing the shaft 18 clockwise in FIG. 1.

The second spring 36, which generates a biasing force that biases the shaft 18 in an opposite direction to the biasing direction of the first spring 35, functions in an opposite matter to the described above. That is, when the seat 1 is shifted from the seat use position to the seat stowed position, the shaft 18 is rotated clockwise in FIG. 1. The second spring 36 restrains the clockwise rotation of the shaft 18 by biasing the shaft 18 in an opposite direction to the clockwise rotation of the shaft 18. On the other hand, when the seat 1 is shifted from the seat stowed position to the seat use position, the shaft 18 is rotated counterclockwise in FIG. 1. The second spring 36 assists the counterclockwise rotation of the shaft 18 by biasing the shaft 18 in the same direction as the counterclockwise direction of the shaft 18. The operation force of the electric motor 19 corresponds to a force for shifting the seat 1 against a rotational momentum of the seat 1, the rotational momentum which is generated in response to an empty weight of the seat 1. The force for shifting the seat 1 can be expressed by a vector defined with main components in a longitudinal direction (a right and left direction in FIG. 1) and in a vertical direction (in an up and down direction in FIG. 1).

FIG. 11 is a diagram for explaining a relationship between an operation angle of the supporting member 11 and an amount of torque required. In FIG. 11, a solid line represents an amount of torque required to move the seat 1, i.e., a required amount of torque that is obtained on the basis of a theoretically calculated value reflected with the use of the four-joint parallel link mechanism and an empty weight of the seat 1. A chain line in FIG. 11 represents an amount of torque that is actually required to move the seat 1 and is reflected with the biasing forces of the first and second springs 35 and 36.

As is apparent from FIG. 11, When the seat 1 is shifted from the seat use position to the seat stowed position, the first spring 35 exerts a biasing force prior to the supporting member of the seat 1 makes an operation angle of 60 degrees, while the second spring 36 starts exerting a biasing force immediately before the supporting member of the seat 1 makes an operation angle of 20 degrees. Therefore, while the supporting member of the seat 1 is within an operation angle range described above, the first spring 35 applies a braking force to the shaft 18, and the second spring 36 applies an assist force to the shaft 18.

As described above, according to the embodiment of the present invention, even if a center of gravity of an object (e.g., a luggage or an occupant) on the seat 1 or a center of gravity of the seat 1 itself alters while the seat 1 is shifting from the seat stowed position to the seat use position or vice versa, it is possible to prevent rattling or shaking due to an undesirable swing of the seat 1, a load undesirably applied to the electric motor 19, backlash of a speed reducing mechanism of the electric motor 19, and so on. Therefore, a smooth movement of the seat 1 can be assured. Moreover, at a time when the seat 1 is just about to be set at the seat use position, the movement of the seat 1 can be smoothed by the biasing force of the first spring 35, and an uncomfortable feeling applied to an occupant can be reduced.

An operation angle of the supporting member 11, at which the first and second springs 35 and 36 can exert spring torques, can be determined by portions at which the first and second springs 35 and 36 are come in contact with the seat cushion frame 2a.

Figure 7:
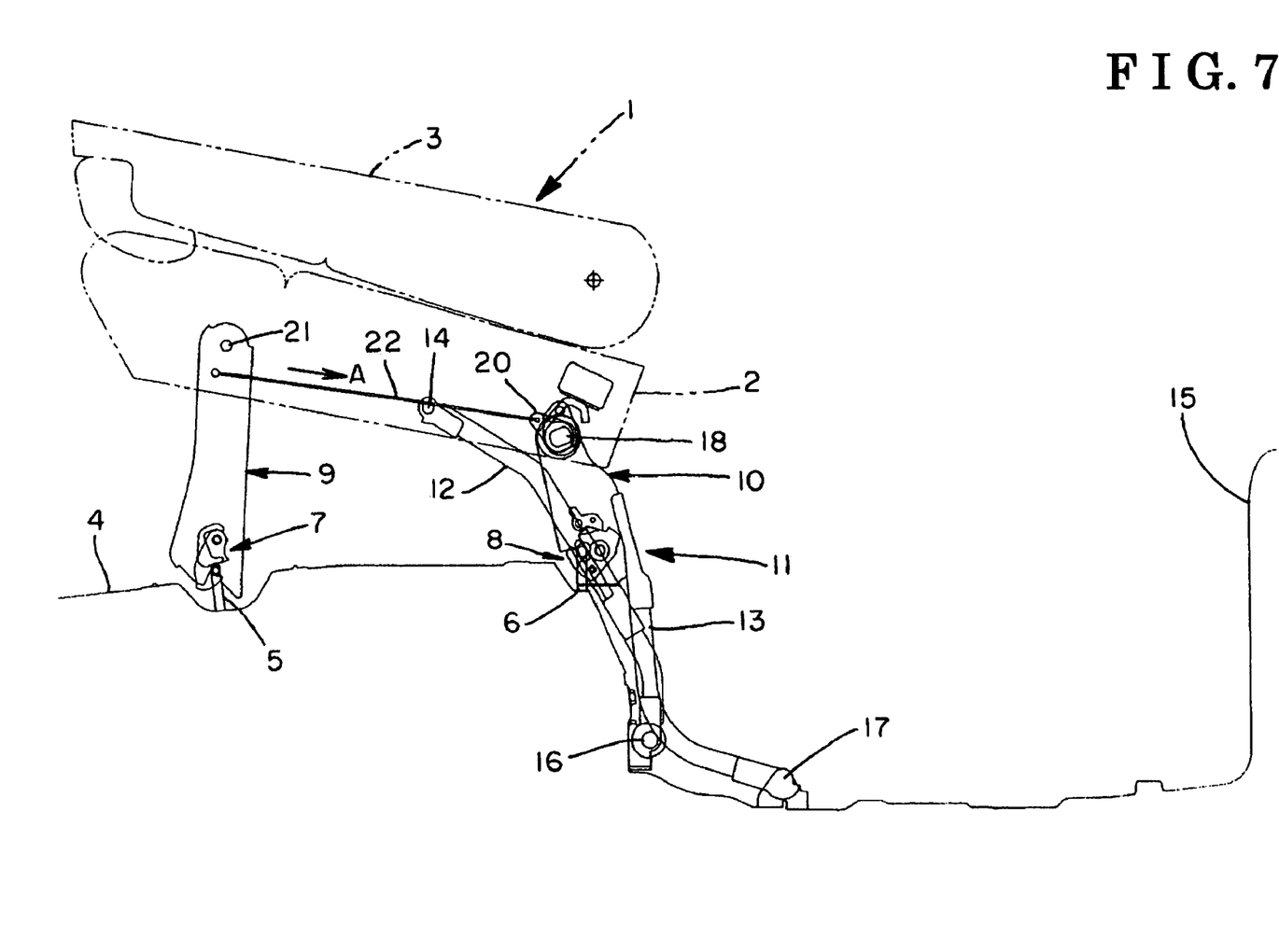
FIG. 7 is a view illustrating the seat in which a seat back is folded upon a seat cushion.
Figure 8:
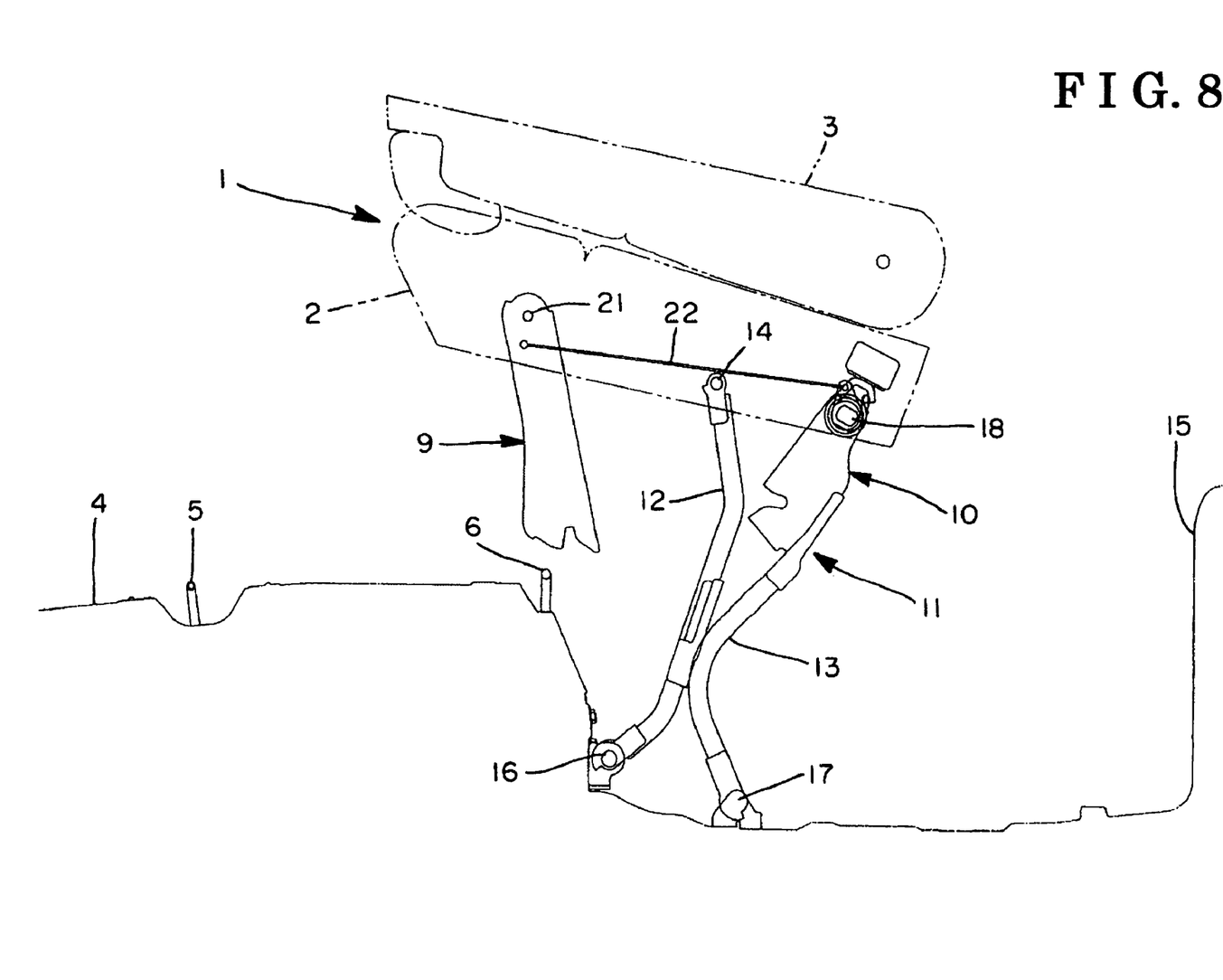
FIG. 8 is a view illustrating the seat moved rearward.

Positions of the seat 1, which are denoted with alphabets A, B, C and D in FIG. 11, are illustrated in FIGS. 7, 8, 9 and 10, respectively. As for the seat 1, which is illustrated in FIG. 7 and is placed at a position denoted with the alphabet A in FIG. 11, the empty weight of the seat 1 is transmitted to the floor 4 via the front leg 9 and the rear leg 10, and the biasing force of the first spring 35 is applied to the shaft 18. While the front leg 9 and the rear leg 10 are being folded in response to the rotation of the shaft 18 by the electric motor 19, the rotation of the shaft 18 leads the first link 12 and the second link 13 to move an intermediate position illustrated in FIG. 8 and leads the seat 1 to the intermediate position illustrated in FIG. 8, i.e., to the position denoted with the alphabet B in FIG. 11.

Figure 9:
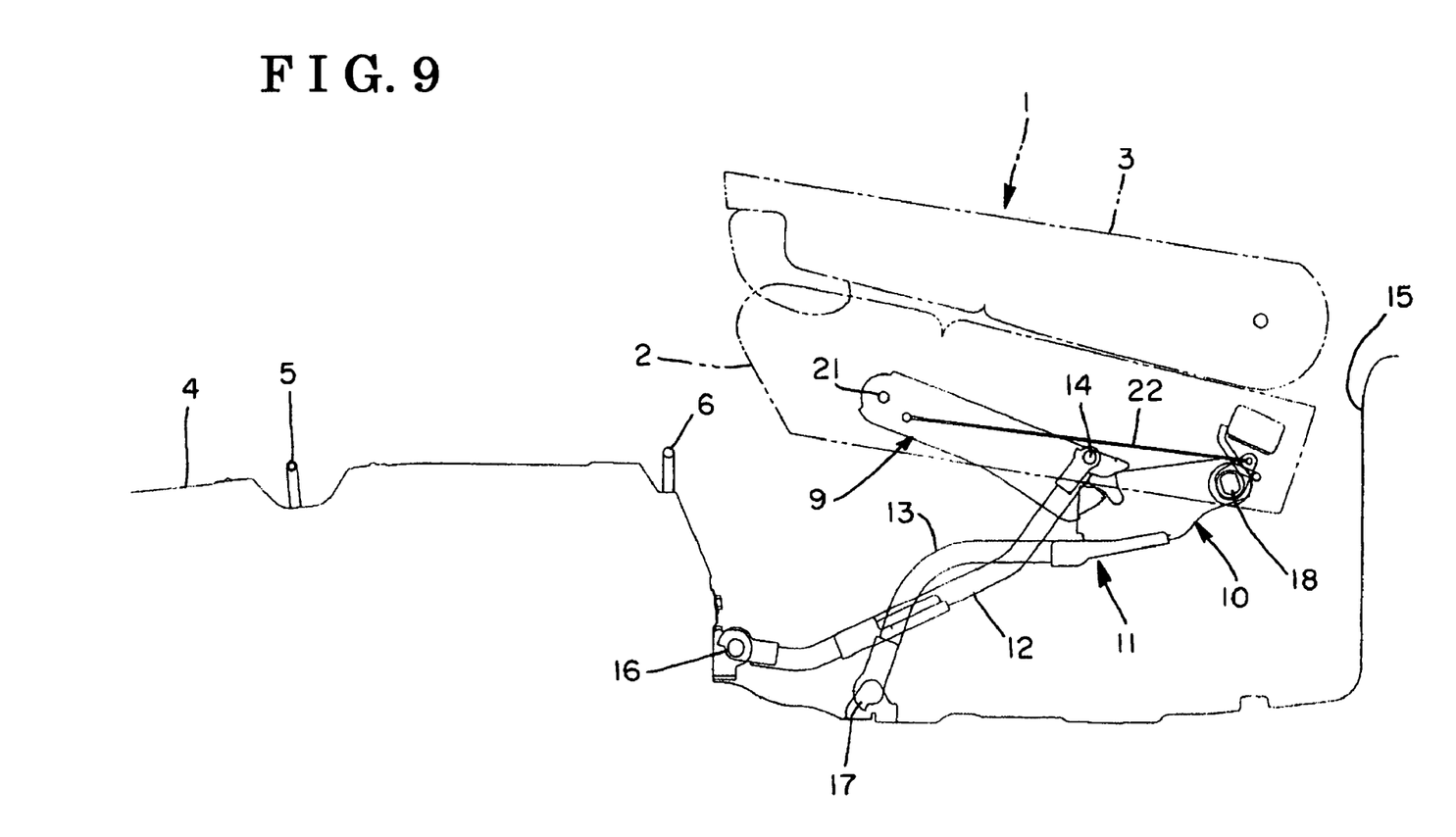
FIG. 9 is a view illustrating the seat moved above a stowing space.
Figure 10:
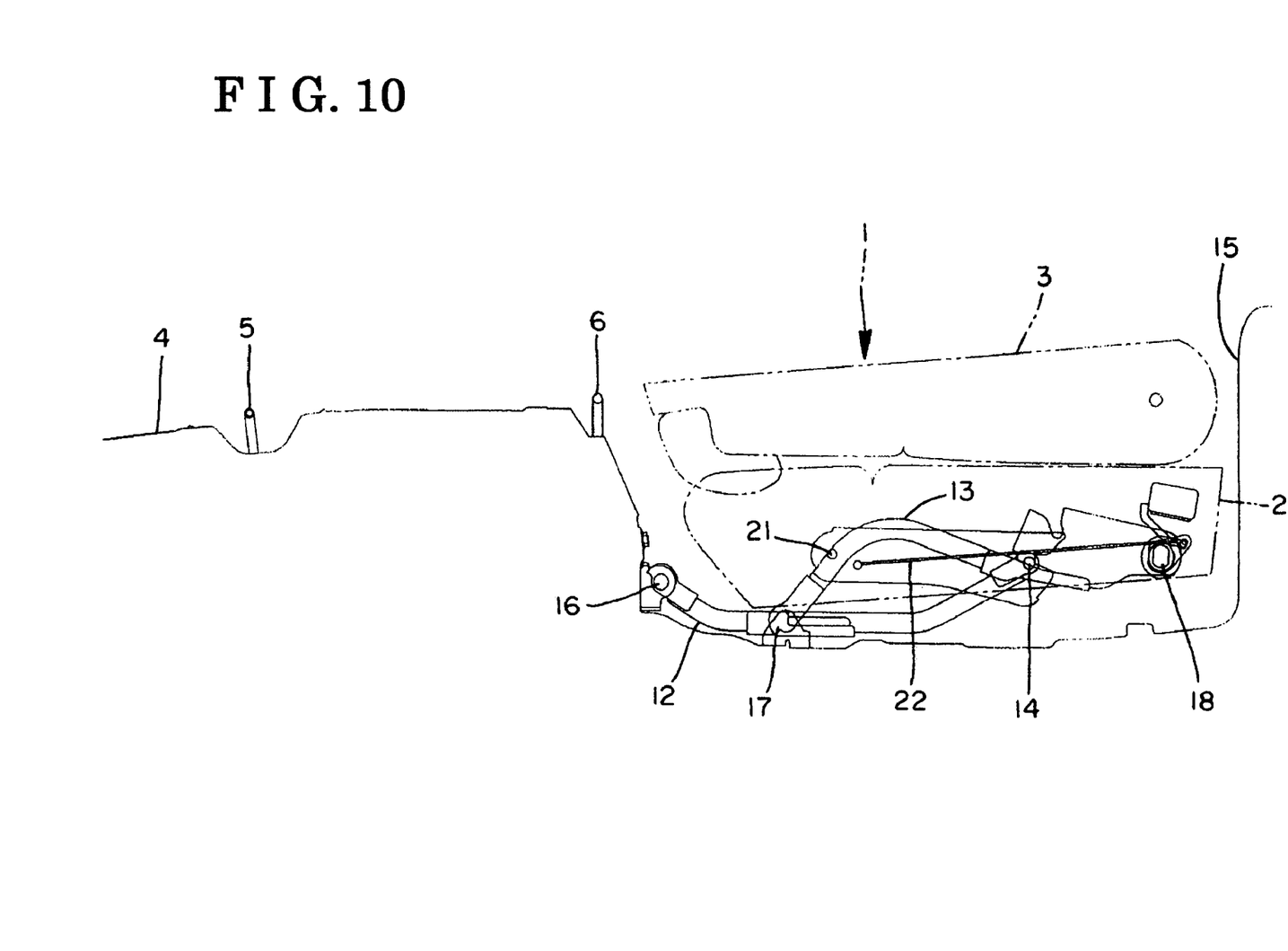
FIG. 10 is a view illustrating the seat stowed in the stowing space.

Further rotation of the shaft 18 leads the seat 1 to a position illustrated in FIG. 9, i.e., to the position denoted with the alphabet C in FIG. 11. Here, the seat 1 is positioned above the stowing space 15 with the legs 9 and 10 being folded, as illustrated in FIG. 9. Still further rotation of the shaft 18 completely stows the seat 1 in the stowing space 15, as illustrated in FIG. 10. The position of the seat 1 stowed therein corresponds to the position denoted with the alphabet D in FIG. 11.

When the seat 1 is shifted from the seat stowed position in FIG. 10 to the seat use position in FIG. 7, an operation, which is opposite to the above, is implemented. Whichever the moving direction of the seat 1 is: from the seat use position to the seat stowed potion or from the seat stowed position to the seat use position, both the first and second springs 35 and 36 exerts biasing forces. Partially while the seat 1 is being moved, the first and second springs 35 and 36 are associated with each other in terms of exerting biasing forces, thereby assuring a smooth movement of the seat 1.

As described above, according to the embodiment of the present invention, when the seat 1 is being shifted from the seat stowed position to the seat use position, and vice versa, it is possible to avoid an undesired swig of an object or the seat 1, an undesired load applied to the electric motor 19, rattling or shaking due to backlash of a speed reducing mechanism of the electric motor 19, all of which may occur due to variation in a position of a center of gravity. Therefore, a smooth movement of an object or the seat 1 can be assured. Moreover, at a time when an object or the seat 1 is just about to be set at a final position or the seat use position, the movement of the object or the seat 1 can be smoothed by the biasing force of the springs 35 and 36, and an uncomfortable feeling applied to a user can be reduced.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat apparatus comprising;
a shaft rotatable by a motor and operatively associated with a seat so as to move the seat;
a first leg secured to the shaft and pivotably supported by the seat;
a first spring, one end of which is fixedly attached to the shaft and another end of which is fixedly attached to the seat, the first spring biasing the shaft in a first rotational direction; and
a second spring, one end of which is fixedly attached to the shaft and another end of which is fixedly attached to the seat, the second spring biasing the shaft in a second rotational direction which is opposite to the first rotational direction.

2. A seat apparatus according to claim 1 further comprising:
a link mechanism which operatively supports the seat on a stationary portion, the link mechanism having a first link pivotably supported by the seat and the stationary portion and a second link, one end of which is secured to the first leg and another end of which is pivotably supported by the stationary portion, the first leg being rotated in response to rotation of the shaft.

3. A seat apparatus comprising:
a link mechanism operatively mounted on a stationary portion and operatively supporting a seat, the link mechanism being driven by a driving unit so that the link mechanism shifts the seat between a first position and a second position;
a first biasing member biasing the link mechanism in a first direction to assist the driving unit in moving the seat from the first position to the second position; and
a second biasing member biasing the link mechanism in a second direction opposite to the first direction so as to restrain the driving unit from moving the seat from the first position to the second position.

4. A seat apparatus according to claim 3, wherein the first biasing member biases the link mechanism in a direction to restrain the driving unit from moving the seat between the second position and the first position, and the second biasing member biases the link mechanism in the direction of the first biasing member so as to assist the driving unit in moving the seat from the second position to the first position.

5. A seat apparatus according to claim 3, wherein the first biasing member and the second biasing member are both springs.

6. A seat apparatus according to claim 3, wherein the link mechanism comprises a first link, which is pivotably supported by the seat and the stationary portion, and a second link, which is pivotably supported by the seat and the stationary portion.

7. A seat apparatus according to claim 6, wherein the driving unit includes a motor and a shaft rotated by a torque of the motor, and at least one of the first link and the second link is operated in response to rotation of the shaft.

8. A seat apparatus according to claim 7, wherein the first biasing member is a first torsion spring, one end of which is fixedly attached to the shaft and another end of which is fixedly attached to the seat, and the second biasing member is a second torsion spring, one end of which is fixedly attached to the shaft and another end of which is fixedly attached to the seat, and
wherein, when the seat is shifted from the first position to the second position, the first torsion spring biases the shaft in the same direction as a rotational direction of the shaft and the second torsion spring biases the shaft in an opposite direction to the rotational direction of the shaft.

9. A seat apparatus according to claim 8, wherein, when the seat is shifted from the second position to the first position, the first torsion spring biases the shaft in an opposite direction to a rotational direction of the shaft and the second torsion spring biases the shaft in the same direction as the rotational direction of the shaft.

10. A seat apparatus according to claim 8, wherein the first torsion spring and the second torsion spring are coiled on the shaft.

11. A seat apparatus according to claim 7, wherein the driving unit is attached to the seat.

12. A seat apparatus according to claim 7, further comprising:
a first leg rotated by the shaft and operatively attaching the seat to the stationary portion,
wherein the second link supports the seat via the first leg.

13. A seat apparatus according to claim 12, further comprising:
a leg, which is different from the first leg, operatively attaching the seat to the stationary portion, wherein the first leg is positioned at a rear portion of the seat and the leg is positioned at a front portion of the seat; and
a cable connecting the first leg and the leg.

14. A seat apparatus according to claim 13, wherein the second link is rotated in response to rotation of the first leg by the shaft, and the cable is fixed to a bracket secured to the shaft.

15. A seat apparatus according to claim 13, wherein the leg is pulled in one direction by a tension of the cable to be rotated.

16. A seat apparatus comprising:
a link mechanism rotatable by a motor and associated with a seat which freely rotatably supports the seat;
a first leg secured to the link mechanism and pivotably supported by the seat;
a first spring which biases the link mechanism in a first rotational direction; and
a second spring which biases the link mechanism in a second rotational direction opposite to the first rotation direction.

17. A seat apparatus according to claim 3, wherein the stationary portion is a floor of a vehicle.

18. A seat apparatus according to claim 16, wherein the stationary portion is a floor of a vehicle.

19. A seat apparatus according to claim 1 further comprising:
a second leg secured to the shaft and pivotably supported by the seat, wherein the first spring and the second spring are provided between the first leg and the second leg.

20. A seat apparatus according to claim 19 further comprising:
a four link mechanism which operatively supports the seat on a floor and having a first link, a second link, a third link and a fourth link,
wherein the first link is pivotably supported by the seat and the floor, the third link is pivotably supported by the seat and the floor, one end of the second link is secured to the first leg and another end of the second link is pivotably supported by the floor, one end of the fourth link is secured to the second leg and another end of the fourth link is pivotably supported by the floor, and the first leg and the second leg are rotated in response to rotation of the shaft.

* * * * *